(12) United States Patent
Ficquette

(10) Patent No.: US 8,504,103 B2
(45) Date of Patent: Aug. 6, 2013

(54) CELLULAR HOME SECURITY SYSTEM

(76) Inventor: Dale Ficquette, Oviedo, FL (US)

( * ) Notice: Subject to any disclaimer, the term of this patent is extended or adjusted under 35 U.S.C. 154(b) by 1232 days.

(21) Appl. No.: 11/836,472

(22) Filed: Aug. 9, 2007

(65) Prior Publication Data

US 2009/0042604 A1 Feb. 12, 2009

(51) Int. Cl.
*H04M 1/00* (2006.01)

(52) U.S. Cl.
USPC .............. 455/556.1; 340/539.14; 340/539.25; 340/541

(58) Field of Classification Search
None
See application file for complete search history.

(56) References Cited

U.S. PATENT DOCUMENTS

| | | | |
|---|---|---|---|
| 5,760,848 A | 6/1998 | Cho | |
| 6,753,774 B2 | 6/2004 | Pan et al. | |
| 6,987,452 B2 | 1/2006 | Yang | |
| 7,679,507 B2 * | 3/2010 | Babich et al. | 340/539.16 |
| 2001/0044827 A1 | 11/2001 | Zhuk | |
| 2002/0005894 A1 * | 1/2002 | Foodman et al. | 348/143 |
| 2002/0024438 A1 | 2/2002 | Roberson | |
| 2004/0036596 A1 * | 2/2004 | Heffner et al. | 340/531 |
| 2004/0080410 A1 | 4/2004 | Pan et al. | |
| 2004/0086093 A1 | 5/2004 | Schranz | |
| 2004/0130624 A1 | 7/2004 | Ryley et al. | |
| 2004/0131357 A1 | 7/2004 | Farmer et al. | |
| 2005/0018766 A1 | 1/2005 | Iwamura | |
| 2005/0066089 A1 | 3/2005 | Karaoguz et al. | |
| 2005/0104730 A1 | 5/2005 | Yang | |
| 2006/0063517 A1 | 3/2006 | Oh et al. | |
| 2006/0209857 A1 | 9/2006 | Hicks, III | |
| 2007/0052531 A1 | 3/2007 | Matthews et al. | |
| 2007/0230744 A1 * | 10/2007 | Dronge | 382/103 |
| 2008/0079563 A1 * | 4/2008 | Crisafulli | 340/531 |
| 2008/0111684 A1 * | 5/2008 | Zinser | 340/541 |

FOREIGN PATENT DOCUMENTS

JP 2003319094 A * 11/2003
WO WO03028375 4/2003

* cited by examiner

*Primary Examiner* — German Viana Di Prisco
(74) *Attorney, Agent, or Firm* — McKinney Law, PLLC

(57) ABSTRACT

The invention provides an improved security system comprised of video cameras and microphones to remotely monitor a home using a cellular telephone. An activation button is mounted as a doorbell button and interconnected with the security system to trigger the audio and video transmissions. The security system will automatically call the homeowner and allow two-way conversation and video using a streaming transmission. In response to a wireless distress signal sent to the security system using the homeowner's cellular telephone establishes a wireless connection with the security system and a security service or local authorities allowing the third-party to monitor and assess the situation. The homeowner is contemporaneously receiving the audio and video signals from the home using his cellular telephone and is capable of communicating directly with the security service. The distress signal is a secret code consisting of an array of numbers.

17 Claims, 6 Drawing Sheets

CELLULAR HOME SECURITY SYSTEM

BACKGROUND OF THE INVENTION

1. Field of the Invention

The present invention relates generally to home security systems, and more specifically to a system using a mobile phone network to transmit a distress signal to automatically alert a security service and remotely transmit audio and video data of what is occurring at the home to the security service so that the security service can respond appropriately.

2. Description of the Prior Art

There is a need for homeowners to feel secure in their home, which has led to the development of a variety of security systems. A typical security system for a home includes all the doors and windows hard wired with sensors to a central processing unit (CPU). Once the electrical connection of the sensor is broken, a signal is sent to the CPU to sound an audio alarm. The alarm alerts the homeowner that the home perimeter has been breached and should call for help. If the alarm is accidentally triggered, the homeowner can access the CPU to reset and disable the alarm. In some of these types of prior art security systems, a security service is notified of the alarm. The security system will call the home phone number to inquire whether it was a false alarm or whether the police need to be sent to the home. However, the security system can be rendered ineffective if an intruder simply cuts the hardwire telephone line on the outside of the home. Accordingly, the security system is unable to automatically alert the authorities or security monitoring service due to the cut telephone line. Accordingly, what is needed in the art is a system that is not susceptible to power loss or being intentionally disabled.

There have been attempts to improve the ability of a homeowner to monitor the home. By way of example, note U.S. Pat. No. 6,753,774 to Pan et al., which describes a security system that transmits audio and video signals with a mobile phone network. However, the security system is not capable of being remotely triggered by the homeowner to connect to a security service to allow the security service to monitor and assess the situation at the home through audio and visual transmissions.

Another example of a prior art security system is Oh et al., Publication No. U.S. 2006/0063517 A1, which describes a system for identifying a visitor and recognizing whether the homeowner is within the home or at a remote location. A shortcoming of Oh et al., is that it does not provide for an interaction with a security service that can respond to an unlawful intruder to the home.

Notwithstanding the existence of such prior art security systems, there is a need for an improved security system that allows a homeowner to monitor his home through wireless audio and visual transmissions and also to transmit a distress signal to the security system to allow the security service to assess the situation.

There is also a need for a security system that can provide the ability of a security service to easily identify and assess a situation through audio and visual transmissions where a distress signal has been received.

However, in view of the prior art at the time the present invention was made, it was not obvious to those of ordinary skill in the pertinent art how the identified needs could be fulfilled.

SUMMARY OF THE INVENTION

The invention provides for an improved security system and is comprised of a video camera and microphone that is installed at the doorway to a home. The video camera is operable at night and under a low illumination environment. An activation button is mounted as a doorbell button within the doorway and will activate the system upon being pushed. Power is supplied to the system using the existing 12-volt power supply wired for the doorbell. However, to alleviate the need to rely completely on an outside power source, the security system is also provided with an internal back-up power source, which maintains its charge using the 12-volt power supply. Therefore, the system is effective during a power loss to the home and will operate if power is knocked out by a storm event or intentionally sabotaged. The power source operates a computer that controls the security system. The computer continually monitors the activation button and serves to activate the video and audio devices upon receiving a signal indicating that a trigger event has occurred. The trigger event is someone pushing the activation button. The security system in the preferred embodiment is a self-contained unit within a tamper-proof housing mounted within the threshold of a home and serves to replace the existing doorbell button. The activation button of the security system maintains the existing electrical connection to activate the doorbell chimes.

When the activation button is pushed the security system will automatically call a pre-programmed cellular telephone number and allow two-way conversation and video of the person at the door. The system can be pre-program med for any telephone number desired such as a security monitoring service, the homeowner's work telephone number, homeowner's work computer modem, or ideally, the homeowner's cellular telephone number. In addition, the homeowner or a security service can trigger the security system by dialing a pre-pre-programmed number that activates security system similarly to the activation button being pushed. This allows the homeowner or security service to confirm at any time and for any reason whether the home is secure. In an alternative embodiment, a satellite phone or similar communications technology is used to interface with the security system rather than a cellular telephone.

If the predetermined telephone number is to the homeowner's cellular telephone, a streaming video and audio broadcast will be received via streaming transmission. This allows for the homeowner to view and converse with whoever is at the door to determine. his/her intentions. The security system further comprises a storage system for recording images, video and audio that can be remotely accessed by the homeowner in the event the call from the security system is missed or is required to be reviewed at a later date. In the preferred embodiment, the storage device is a flash memory chip, which is compact and lightweight.

The present invention further comprises a distress signal means that provides for the ability of the homeowner to send a wireless distress signal to the security system using his cellular telephone. The homeowner establishes a wireless connection with the security system using a cellular telephone number assigned to the security system as described above. Once that connection is established, the homeowner can key in a secret code that the security system recognizes as a distress signal. The security system automatically initiates a wireless connection with a predetermined security service using a preprogrammed telephone number. Once that connection is established, audio and video signals are received by the security service to monitor and assess the situation at the home. The homeowner is contemporaneously receiving the audio and video signals from the home using his cellular telephone and is capable of communicating directly with the security service. The distress signal is a secret code consisting of an array of numbers.

In another embodiment of the present invention, the security system is adapted to interface with an existing home security system and to serve as another layer of protection. Sensors are installed and interconnected with the present security system such that the window and door sensors can automatically trigger the system. The computer continually monitors all sensors and serves to activate the video and audio devices upon receiving a signal indicating that a trigger event has occurred. The trigger event is the opening of a window or door, among other things. The computer monitors all sensors and the activation button.

Moreover, prior art security systems can be rendered ineffective if an intruder simply cuts the hardwire telephone line on the outside of the residence. Accordingly, the prior art security system is unable to automatically alert the authorities or security monitoring service due to the cut telephone line.

A primary object of the invention is to provide a security system that is not susceptible to power loss or being intentionally disabled.

Another very important object of the invention is to provide a security system that enables a security service to easily identify, and assess a situation using wireless audio and visual transmissions where a distress signal has been received.

Another important object of the invention is to provide a security system that is easy to program and install.

Still another very important object of the invention is to provide a security system that records images and video that can be retrieved remotely.

These and other important objects, advantages, and features of the invention will become clear as this description proceeds.

The invention accordingly comprises the features of construction, combination of elements, and arrangement of parts that will be exemplified in the description set forth hereinafter and the scope: of the invention will be indicated in the claims.

BRIEF DESCRIPTION OF THE DRAWINGS

For a fuller understanding of the nature and objects of the invention, reference, should be made to the following detailed description, taken in connection with the accompanying drawings, in which.

DETAILED DESCRIPTION OF THE PREFERRED EMBODIMENT

Figure 1:
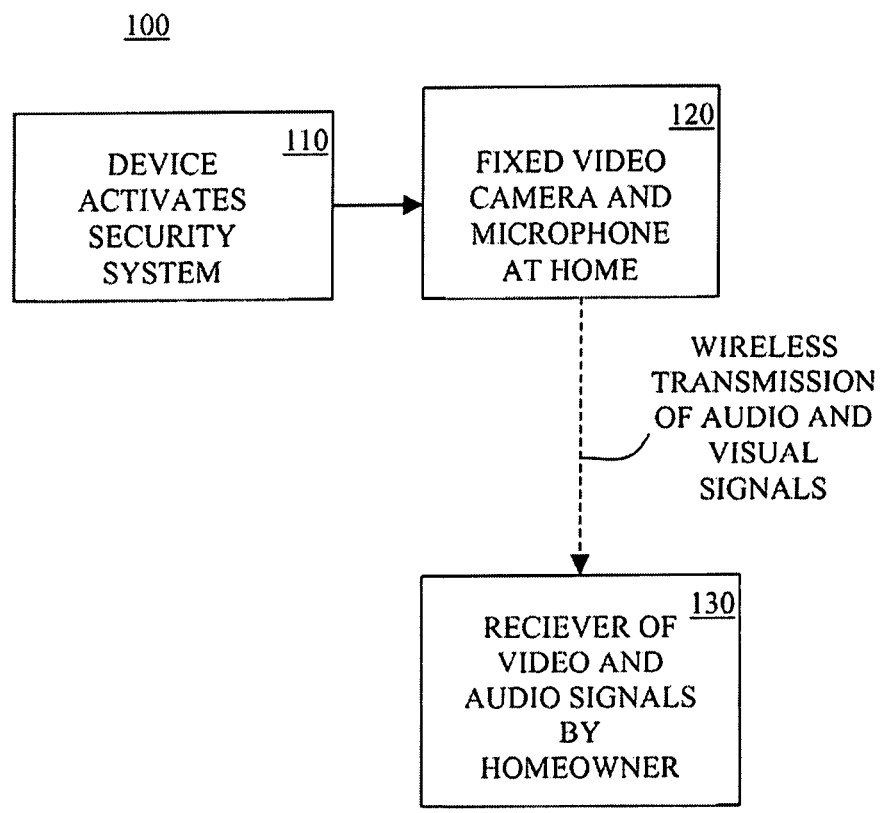
FIG. 1 is a block diagram of a prior art security system that transmits audio and video signal to a homeowner.

As illustrated by FIG. 1, the prior art security systems allow video and audio signals to be transmitted to a homeowner at a remote location. Typically, some type of device activates the system 110 and begins transmitting signals 120 that are received by a homeowner 130 on a cellular telephone. After the homeowner receives the signals he can monitor the home but the prior art security system has no ability to take any further action. Therefore, the homeowner can witness his home being burglarized but must end the transmission from the security system to notify local authorities. The authorities have no ability to assess the situation to determine the best method to approach the home or determine the extent of the danger and the number of suspects, among other things.

Figure 2:
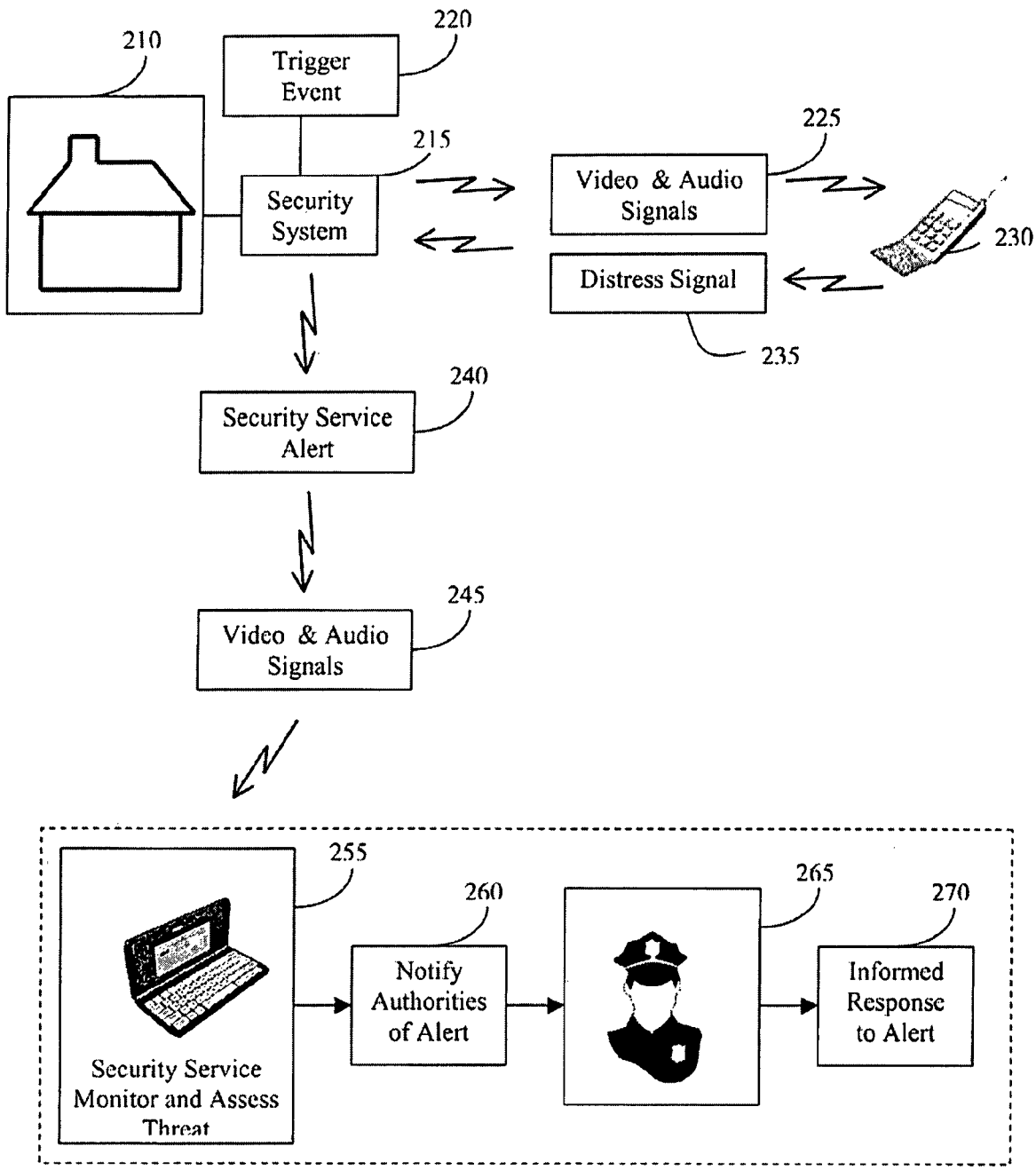
FIG. 2 is a block diagram of the security system according to the preferred embodiments of the present invention.

Referring now to FIG. 2, shows the present invention. Home 210 is installed with an activation button that serves as a doorbell and also to trigger system 110. In an alternative embodiment, sensors are mounted at windows and doors to detect a breach of the perimeter of home 210. The hardware and software of security system 215 is in electrical communication with the activation button. Security system 215 is programmed to recognize, trigger event 220. For example, a trigger event 220 can be the activation button being pushed or in an alternative embodiments a window or door being opened, etc. A trigger event can also be the homeowner calling the security system to activate the audio and video signals transmission 225. Any predetermined trigger event will initiate the audio and video transmission 225 to a homeowner's cellular telephone 230. In alternative embodiments, audio and video signals are transmitted to a homeowner's satellite phone, laptop computer, PDA, or any device capable of receiving audio and video transmissions.

After the wireless connection is established between the security system and the homeowner, the homeowner can monitor and assess the situation. In the event that the activation button was the source of trigger event 220, the homeowner can communicate with the person at the door. If trigger event 220 was potentially an unauthorized entry of the home, the homeowner can initiate distress signal 235. Distress signal 235 is a secret code that upon receiving by security system 215, security system 215 initiates a security service alert 240. Security service alert 240 establishes a wireless connection with security service 255 and transmits video and audio signals. Security service 255 can assess and monitor the home to determine the best courset of action. If appropriate, security service 255 notifies the local authorities 260 and requests a response. Local authorities 265 provide an informed response 270 using information received by security service 255 as to the number of potential intruders, the appearance of the intruders and the best approach to the home, among other things.

Figure 3:
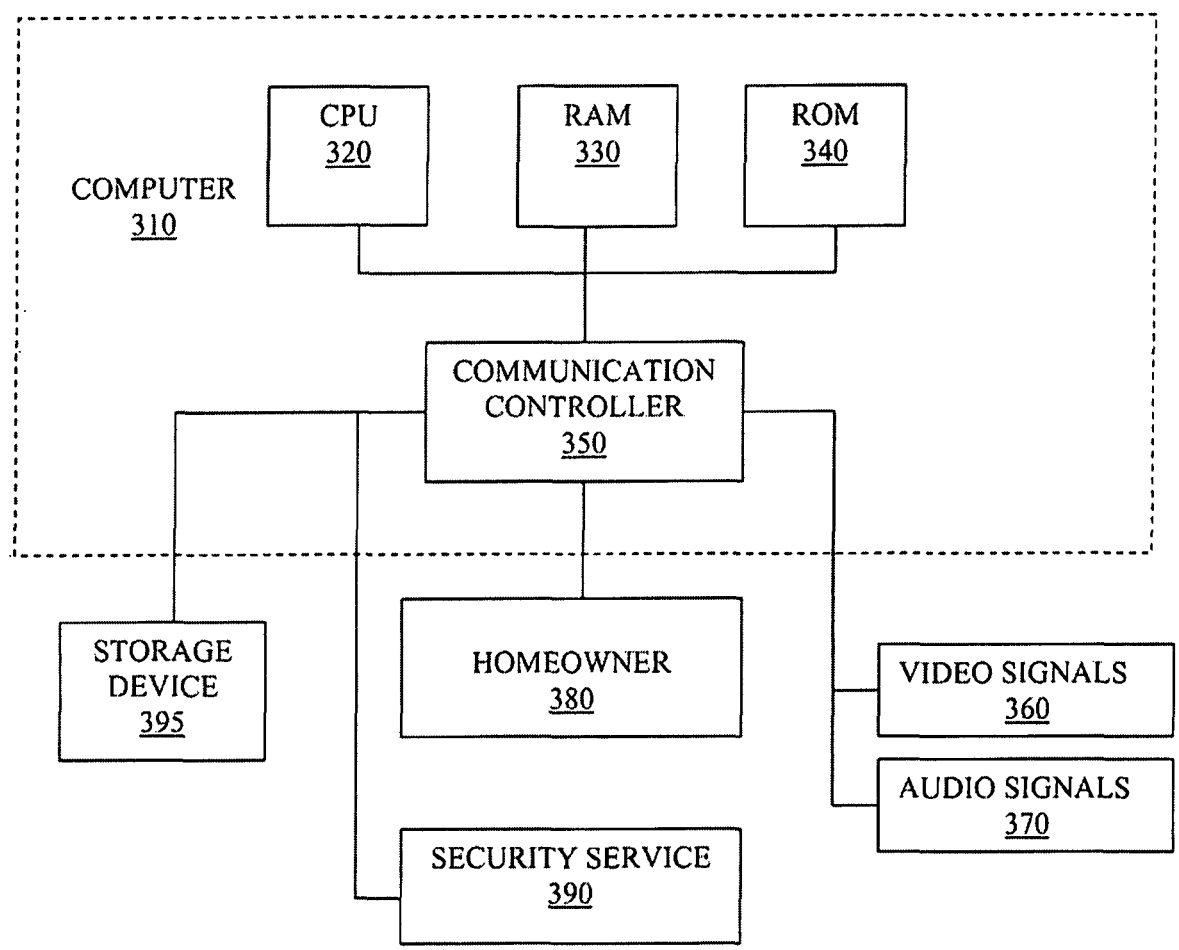
FIG. 3 is a block diagram of a computer system that may be employed in the present invention.

A computer 310 that may be used in the present invention is shown in FIG. 3. Computer 310 may be configured in a number of different forms for accepting input, processing the input according to specified instructions, and outputting the processing results, as is well known in the art. In the preferred embodiment, computer 310 is a stand-alone device not operating within a networking environment and preferably includes a central processing unit ("CPU") 320, a random access memory ("RAM") 330, a read-only memory ("ROM") 340, a disk controller 350 and a communication controller 360. In preferred embodiments, ROM 340 stores various controlling programs for the audio and video transmissions. RAM 330 is preferably used for selectively loading controlling programs and/or application programs. Storage device 395 is generally representative of a flash memory chip, hard drive, floppy disk drive, compact-disk ("CD") drive, etc.

Communication controller 350 may be an aggregate of controllers for facilitating interaction between CPU 320 and the audio and video equipment. According to preferred embodiments, communication controller 350 also facilitates interaction between CPU 320 and the homeowner 380 and/or security service 390.

Those of skill in the art will recognize that the components depicted in FIG. 3 are provided by way of example and are not intended to limit the present invention.

Figure 4:
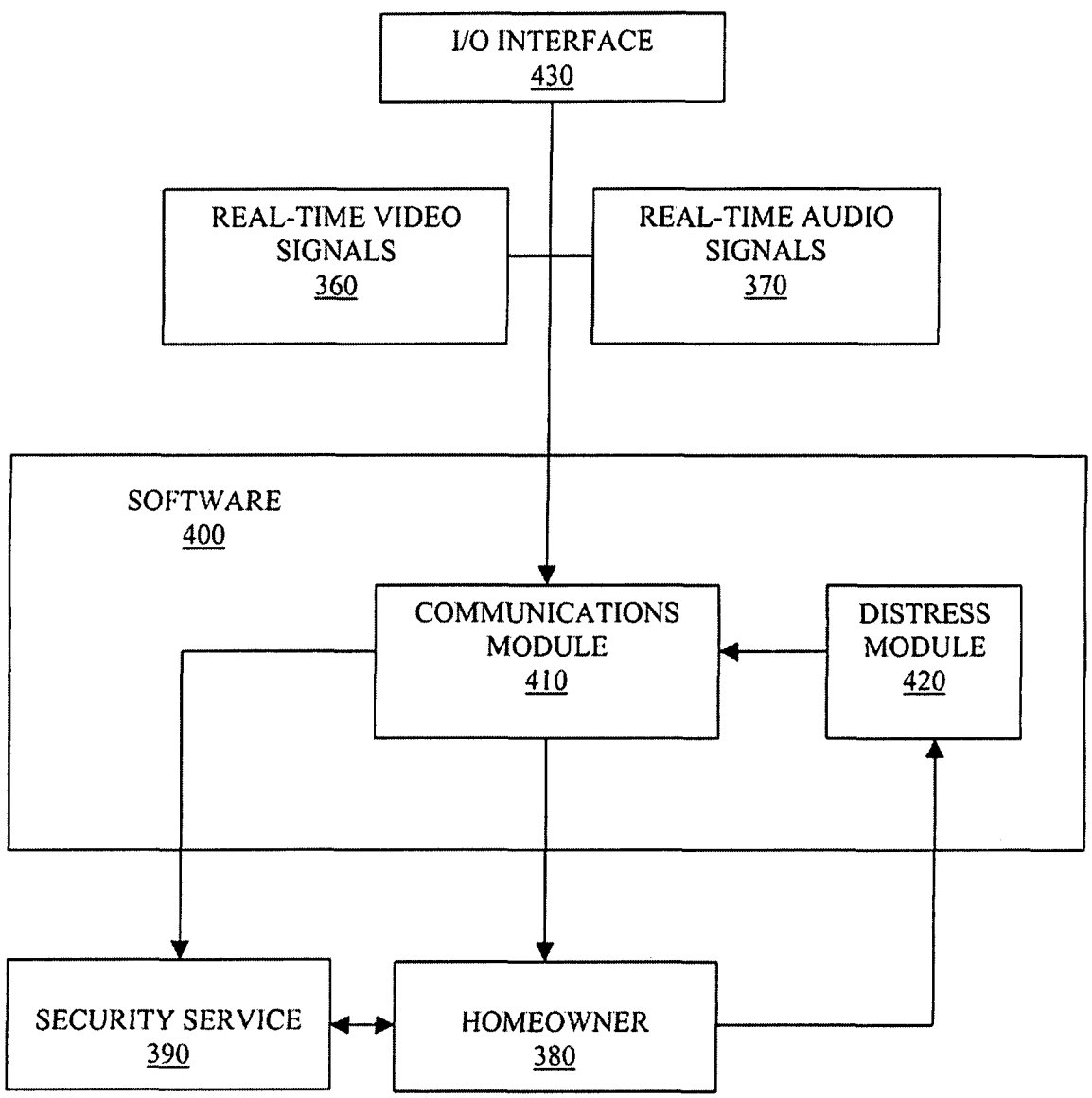
FIG. 4 is a block diagram of computer software which may be employed in the computer system of FIG. 3, according to the preferred embodiments of the present invention.

Referring now to FIG. 4, software 400 is illustrated. Software 400 preferably comprises one or more modules written in an object-oriented language, and executes on computer 310 of FIG. 3 to provide a home security system monitoring routine (shown in FIG. 5) under control of an operating system. The modules comprising software 400 may be physically stored within one or more fixed or removable computer-readable media that is electrically, magnetically, optically, chemically, or otherwise altered to store computer-readable program code, where this media is readable by a device such as disk drive 395.

In other embodiments of computer 310, software 400 may be stored in one or more other computer-readable media, such as a CD-ROM disk. Alternatively, software 400 or portions thereof may be downloaded to RAM 330. In other embodiments of computer 310, software 400 can be partially or fully implemented with digital circuitry, analog circuitry, or a combination thereof.

In preferred embodiments, software 400 includes a communications module 410 and a distress module 420. Communications module 410 allows for the homeowner to first monitor the home by receiving audio and video transmissions. If the homeowner determines that there is a problem that requires assistance of a security service, a distress signal is sent by the homeowner to the security system to allow the security service to access the audio and video communications.

Figure 5:
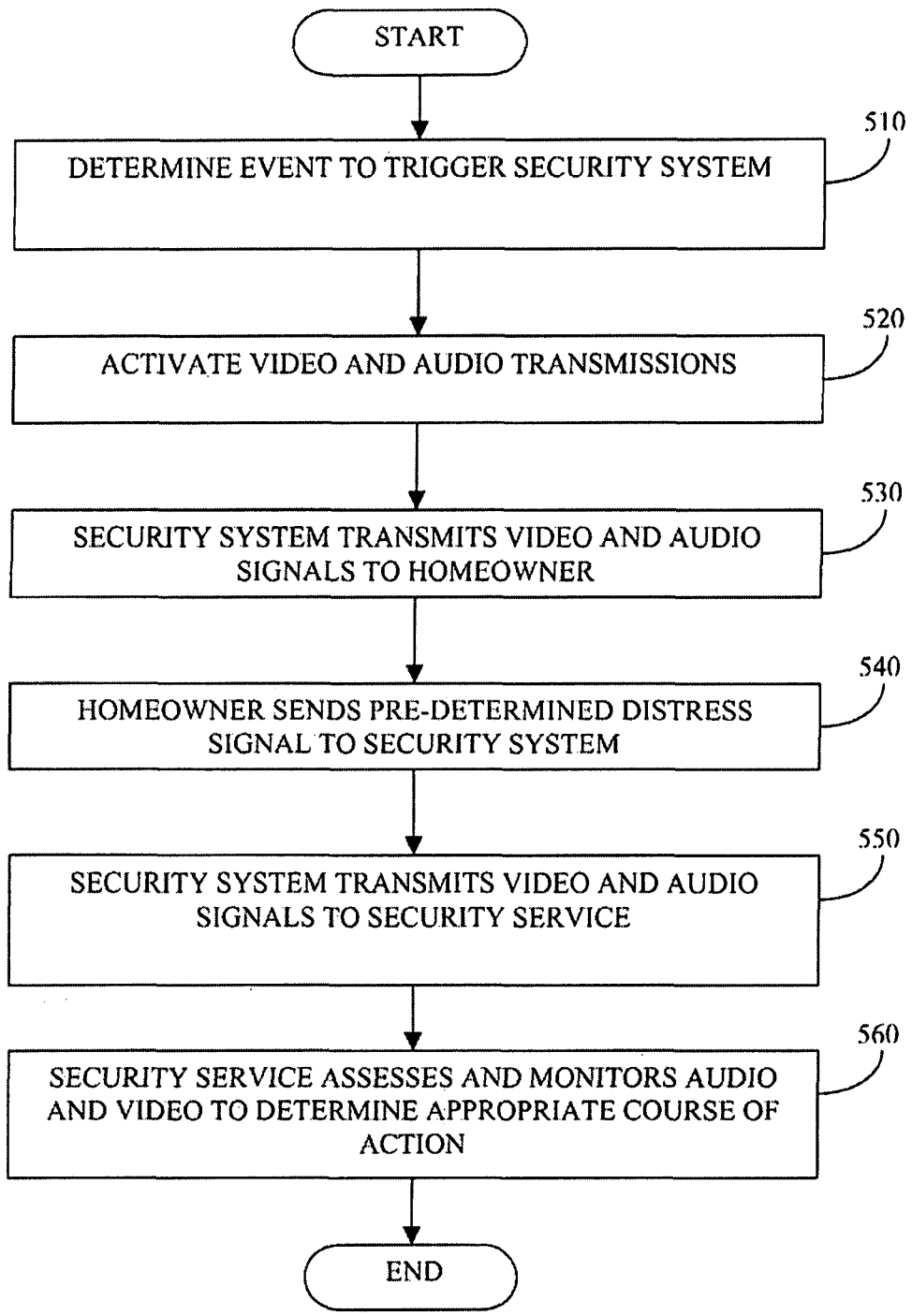
FIG. 5 provides a flowchart illustrating logic of the present invention that may be used to implement a cellular home security system according to preferred embodiments of the present invention.

FIG. 5 provides a flow chart illustrating logic that may be used to implement preferred embodiments of the security system. As shown in FIG. 5, predetermined events are established to determine what will trigger the security system 510. The trigger events may include die pushing the activation/doorbell button, motion sensors, or window/door sensors, among others. Once the security system determines that a trigger event has occurred, video and audio transmissions are initiated 520. The transmissions are first sent to the homeowner 530 via wireless communication means, which is a cellular telephone in the preferred embodiment. At the option of the homeowner, a distress signal is sent to the security system 540. The distress signal is a numerical code that is keyed on a cellular telephone. Upon receipt of the distress signal, the security system then transmits the audio and video signals to a security service 550. The security service is then able to monitor and assess the situation and determine an appropriate course of action 560. This may include notifying the local authorities for assistance.

Figure 6:
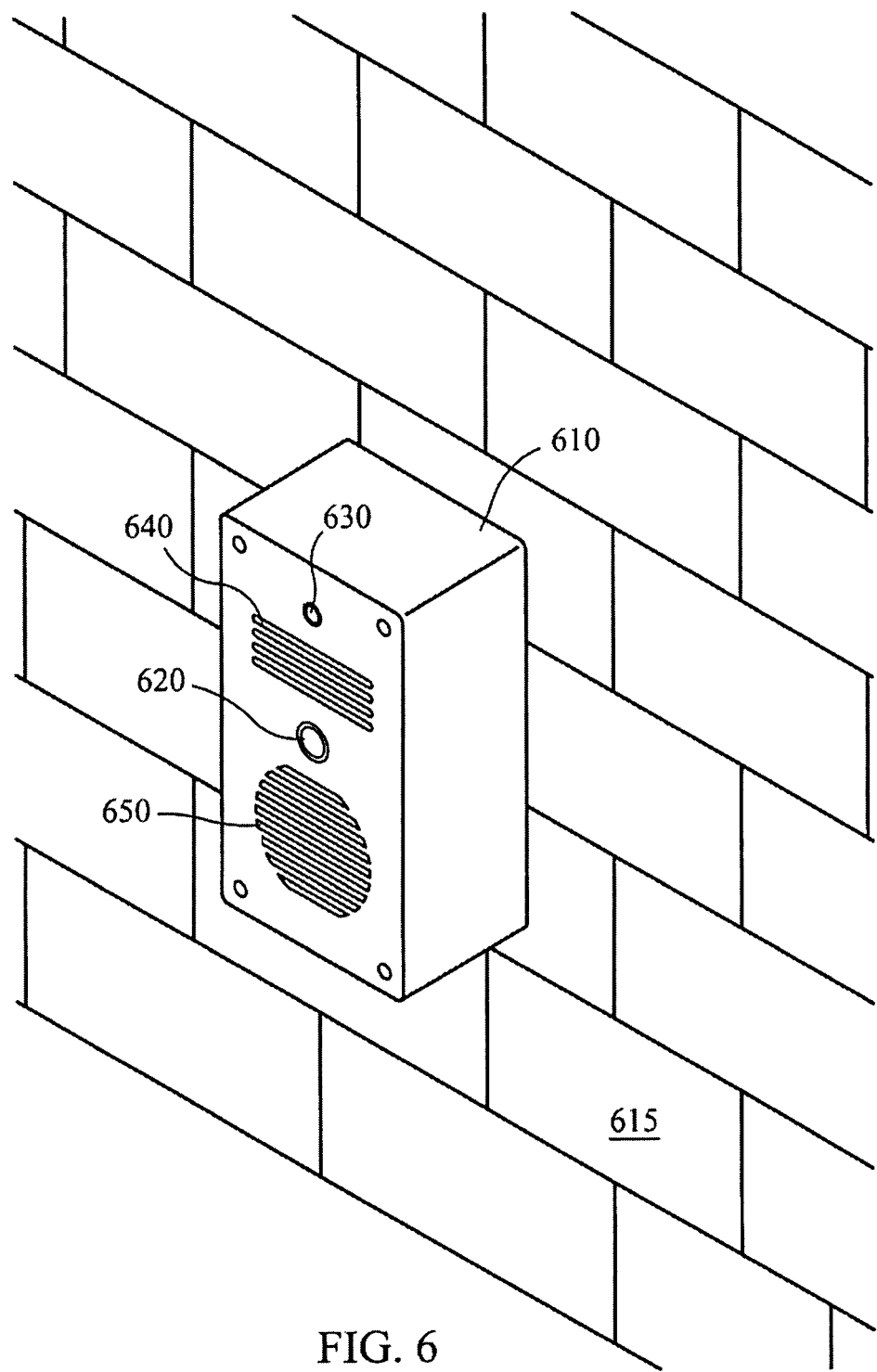
FIG. 6 is an embodiment of the present invention installed at a home.

Referring now to FIG. 6, tamper-proof housing 610, which contains the components of the security system, is mounted to wall 615 at the threshold of a home. Activation button 620 is used to trigger security system 110 and also serves to replace the existing doorbell. Security system 110 is wired using the existing 12-volt power for the doorbell. An internal back-up power source will allow security system 110 to continue to operate even if the home power source is interpreted. Video camera 630 captures the video and operates under low light conditions using an infrared light source (not shown). Microphone 640 and speaker 650 of system 110 provides the ability of the homeowner to converse with an individual standing at the home's threshold.

As will be appreciated by one of skill in the art, embodiments of the present invention may be provided in various forms, including methods, systems, or computer program products. Accordingly, the present invention may take the form of an entirely hardware embodiment, an entirely software embodiment, or an embodiment combining software and hardware aspects. Furthermore, the present invention may take the form of a computer program product that is embodied on one or more computer-readable storage media (including, but not limited to, flash memory chip, disk storage, CD-ROM, optical storage, and so forth) having computer-readable program code embodied therein.

The present invention has been described with reference to flow diagrams and/or block diagrams of methods, apparatus (systems), and computer program products according to preferred embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flow diagram flow or flows and/or block diagram block or blocks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

It is also to be understood that the following claims are intended to cover all of the generic and specific features of the invention herein described, and all statements of the scope of the invention, which as a matter of language, might be said to fall therebetween.

Now that the invention has been described,

What is claimed is:

1. A security system, the system comprising:
a video camera installed at a doorway to a home;
a microphone mounted proximate to the video camera;
an activation button mounted as a doorbell button within the doorway so that the security system is activated upon being pushed;

an independent back-up power source so the security system is operable during a power loss to a home power supply;

a computer in electrical communication with the video camera, the microphone, and the activation button so that the computer continually monitors and serves to control the video and audio devices, wherein the computer further comprises a communications module for wirelessly transmitting audio and video signals;

a cellular telephone device for remotely and wirelessly receiving the audio and video signals from the communications module; and a receiver adapted to receive a distress signal transmitted by the cellular telephone device in response to a homeowner dialing a pre-programmed number to transmit the distress signal, wherein the distress signal initiates a connection between a predetermined security service and the audio and video signals already transmitting from the communications module to a homeowner.

2. The security system of claim 1, further comprising a storage device for recording images, video and audio so that the homeowner can remotely access the storage device to review.

3. The security system of claim 1, further comprising a streaming video so that the homeowner can converse with whoever is at the door to determine his intentions and visualize who is at the door.

4. The video camera of claim 1, further comprising the ability to capture images in low illumination environments.

5. The security system of claim 1, wherein the communications module is pre-programmed with a telephone number of the homeowner.

6. The security system of claim 1, wherein the communications module is pre-programmed with the homeowner's work telephone number.

7. The security system of claim 1, wherein the communications module is pre-programmed with a telephone number of a security service.

8. The security system of claim 1, further comprising a plurality of sensors installed and interconnected with the security system such that the sensors can automatically trigger the security system.

9. A method of providing security to a home, the method comprising:

imaging a scene using a video camera;

receiving audible signals using a microphone mounted proximate to the video camera;

activating the security system when an activation button is pushed;

monitoring a plurality of sensors using a computer in electrical communication with the video camera, the microphone, the activation button and the plurality of sensors so that the computer continually monitors all sensors and serves to control the video and audio devices;

wirelessly transmitting audio and video signals to a cellular telephone device of a homeowner; and receiving a distress signal transmitted by the cellular telephone device in response to the homeowner dialing a pre-programmed number to transmit the distress signal, wherein the distress signal initiates a connection between a predetermined security service and the audio and video signals already transmitting to the cellular telephone device.

10. The method of claim 9, further comprising recording images, video and audio so that the homeowner can remotely access to review.

11. The method of claim 9, further comprising streaming video so that the homeowner can converse with whoever is at the door to determine his intentions and visualize who is at the door.

12. The method of claim 9, further comprising providing the video camera with the ability to capture images in low illumination environments.

13. The method of claim 9, further comprising pre-programming the security system with a telephone number of the homeowner.

14. The method of claim 9, further comprising pre-programming the security system with the homeowner's work telephone number.

15. The method of claim 9, further comprising pre-programming the security system with a telephone number of a security service.

16. The method of claim 9, further comprising installing and interconnecting the plurality of sensors with the security system such that the sensors can automatically trigger the security system.

17. A computer program product for controlling a security system to monitor a home, the computer program product embodied on one or more non-transitory computer-readable media and comprising:

computer-readable program code for determining an occurrence of an event that triggers the security system;

computer-readable program code for activating video and audio transmissions upon occurrence of the event;

computer-readable program code for transmitting video and audio signals to a cellular telephone of a homeowner upon activation; and computer-readable program code for receiving a distress signal transmitted by the cellular telephone in response to the homeowner dialing a pre-programmed number to transmit the distress signal, wherein the distress signal initiates a connection between a predetermined security service and the audio and video signals already transmitting to the cellular telephone.

\* \* \* \* \*